May 28, 1940. B. O. LEACH 2,202,348
REVERSIBLE DISK PLOW
Filed April 26, 1938 2 Sheets-Sheet 1
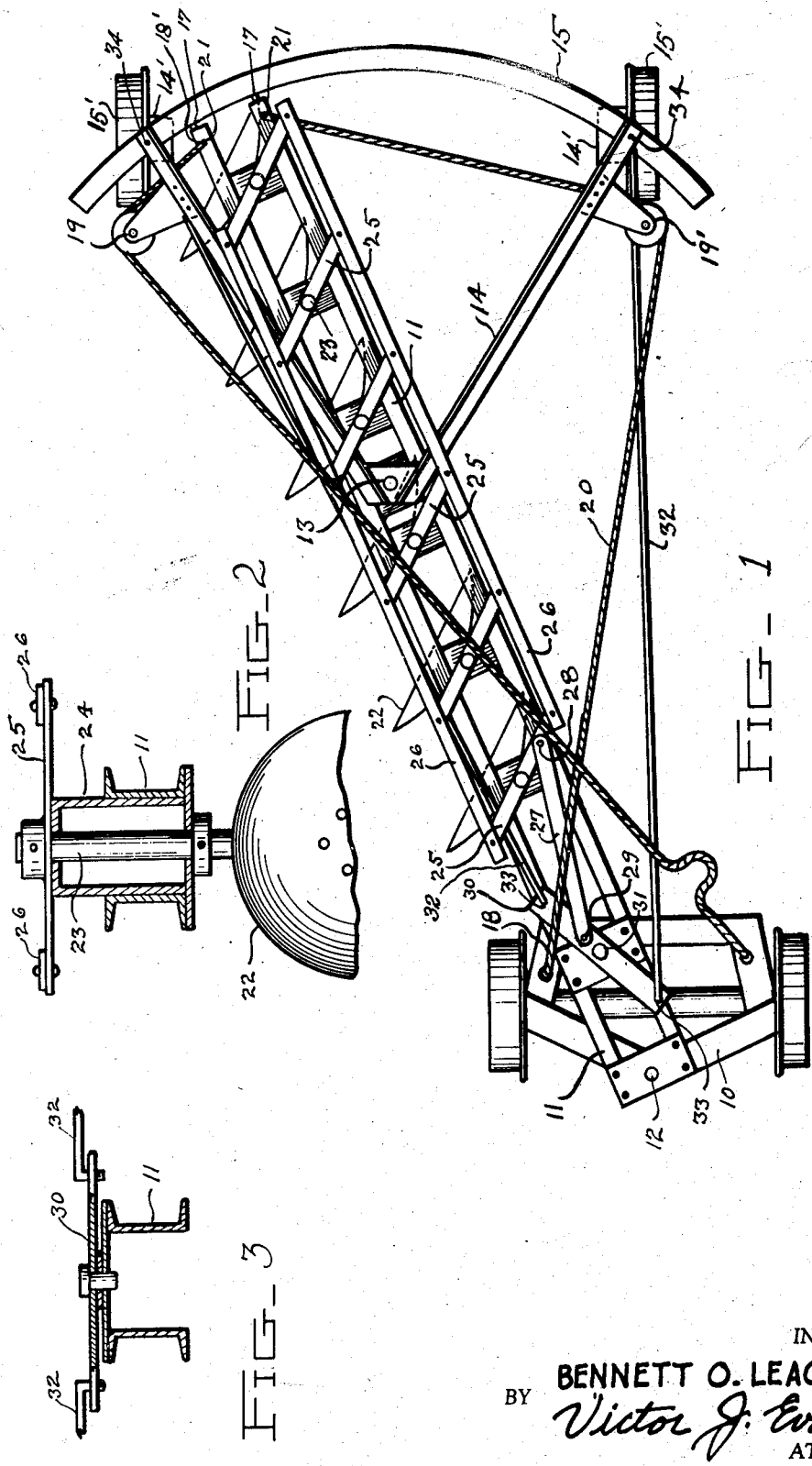
INVENTOR.
BENNETT O. LEACH
BY Victor J. Evans Co
ATTORNEY.

May 28, 1940.   B. O. LEACH   2,202,348
REVERSIBLE DISK PLOW
Filed April 26, 1938   2 Sheets-Sheet 2
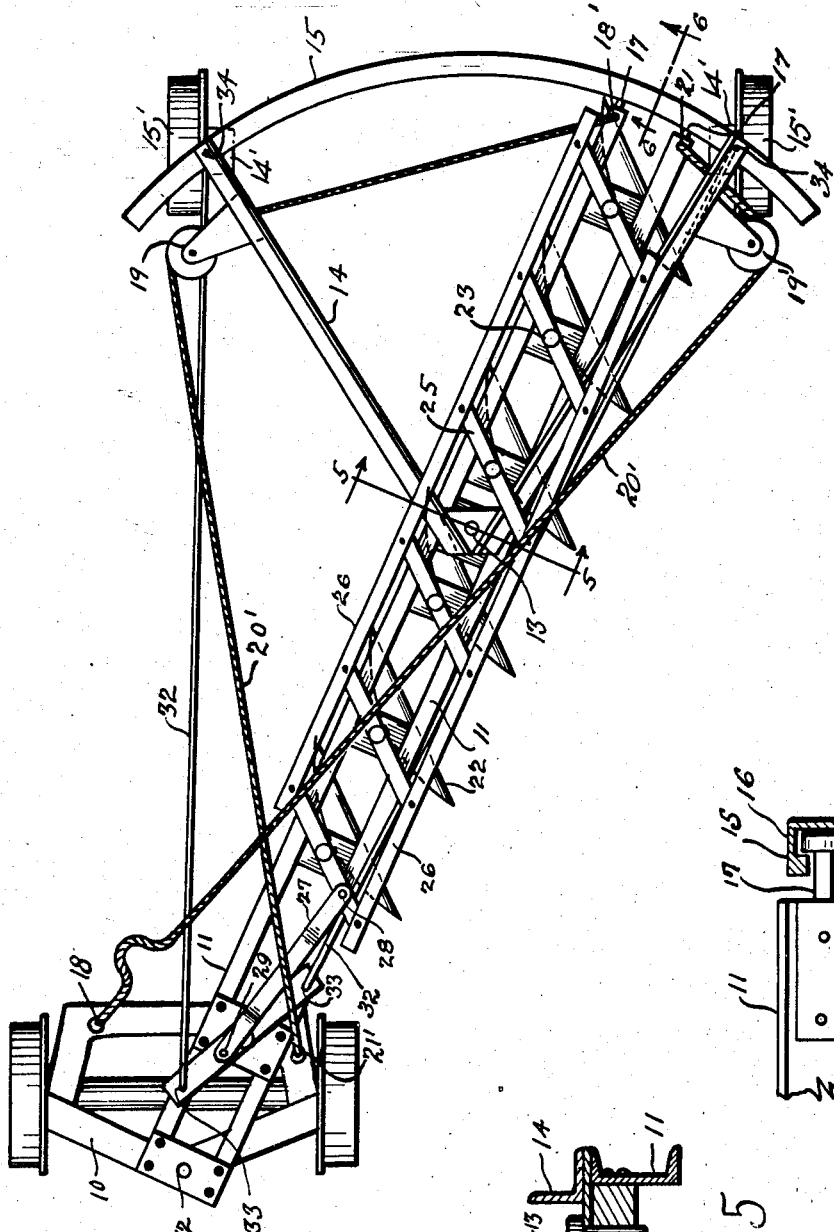
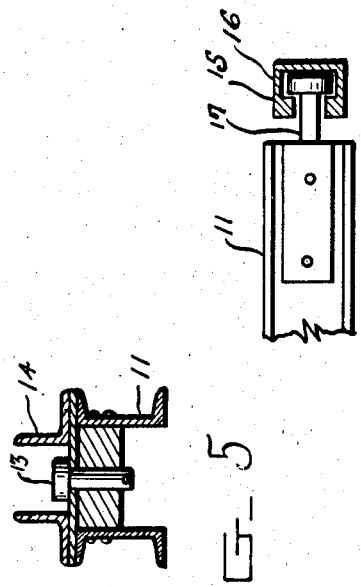
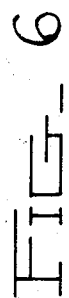
INVENTOR.
BENNETT O. LEACH
BY
ATTORNEY.

Patented May 28, 1940

2,202,348

UNITED STATES PATENT OFFICE 2,202,348

REVERSIBLE DISK PLOW

Bennett O. Leach, Westmoreland, Calif.

Application April 26, 1938, Serial No. 204,393

3 Claims. (Cl. 97—32)

This invention relates to plows and more especially to reversible disk plows.

An object of the invention is to provide a simple, practical and inexpensive gang plow of the character described.

Another object is to provide an improved type of reversible plow of the gang disk type wherein the disks are automatically reversed when the frame carrying the disks is swung from right to left position and vice versa.

Other objects and advantages will appear and be brought out more fully in the following specification, reference being had to the accompanying drawings, wherein Fig. 1 is a plan view of an embodiment of my invention showing the disk beam in the left hand position;

Fig. 2 is a fragmentary sectional elevation as seen through one of the disk pivots;

Fig. 3 is a fragmentary sectional elevation taken through the reversing lever pivot;

Fig. 4 is a view similar to Fig. 1 with the disk frame in the right hand position;

Fig. 5 is a sectional elevation taken along the line 5—5 of Fig. 4; and

Fig. 6 is a sectional view taken along the line 6—6 of Fig. 4.

Referring more particularly to the drawings, I show a plow having a rear truck 10, a main frame 11 pivoted thereto at 12 and pivoted at 13 to a frame 14, which comprises an arcuate member 15, secured to frame 14 and is provided with a guide channel 16 adapted to receive a guide member 17 suitably secured to the front end of main frame 11. The front end of the frame has at each side a downwardly depending bracket 14' which is secured to the lower face of the frame 14 and the arcuate member 15. The lower ends of each bracket are provided with a stub-axle upon which are mounted the wheels 15'. The frame 14 on each side is provided with a pulley 19 and 19' and secured to the plow frame 11 at 21' is a cable 20 which passes over the pulley 19 and is secured to the frame 10 at 18'. A second cable 20' is secured to the frame 11 at 21 and passes over the pulley 19' and is secured to the opposite side of the frame 10 at 18. From the foregoing description, it will be seen that the frame 11 is held in the position shown in Figures 2 and 4, by the drag of the plows thereon, after the rear truck has been shifted to the position shown in each figure. The cables 20 and 20' being secured to the frame 11 at 21 and 21' and having their rear ends secured to the frame 10 at 18 and 18', the frame 10 can not swing in either direction. When it is desired to shift the position of the frame 11 from the position shown in Figure 1, to the position shown in Figure 4, the cable 20 is pulled and freely passes over the pulley 19 and the frame 11 is shifted. A plurality of plow disks 22 are pivotally connected each by a shaft 23 to a bearing block 24 secured to frame 11, each shaft 23 is secured to a lever arm 25 and the lever arms are all connected together by a pair of links 26. A link 27 is pivotally connected at 28 to one of the lever arms 25 and pivotally connected at 29 to a reversing lever 30 which is pivotally connected at 31 to frame 11. A pair of reversing rods 32 are pivotally connected at 33 to lever 30 and pivotally connected at 34 to front frame 14.

The operation of the invention should be apparent from the following description.

It will be understood that the plow disks 22 will be suitably lifted from the furrows by any appropriate mechanism which is not concerned with the present invention and is not shown or described herein. When the plow disks have been so lifted and the direction of the plow reversed, the frame 11 is reversed by pulling cable 20 which swings frame 11 from one side to the other and this movement will cause lever 30 to be turned on its pivot 29 by reversing rods 32 and this movement will be transmitted through link 27 to the arms 25 and links 26, and this movement will reverse the angle of the plow disks from one position to the other as shown in Figs. 1 and 4. Guide channel 16 in member 15 will provide a bearing guide for the front end of frame 11 for this reversing movement.

Having described my invention, what I claim is:

1. A reversible disk plow as described having front and rear trucks, a plow frame pivotally connected to said trucks, a plurality of plow disks pivotally connected to said frame, and reversing means for said disks, said means including lever arms for said plow disk pivots, a link inter-connecting said arms, a reversing lever pivoted to said frame and having a link connection to one of said trucks and a link connection between said lever and said lever arms.

2. A reversible disk plow as described having front and rear trucks, a plow frame pivotally connected to said trucks, a plurality of plow disks pivotally connected to said frame, and reversing means for said disks, said means including lever arms for said plow disk pivots, a link interconnecting said arms, a reversing lever pivoted to said frame and having a link connection to one of said trucks, a link connection between said lever and one of said lever arms, a cable connected to the rear truck and passing over a pulley carried by the forward truck and secured to the plow frame, and a second cable connected to the opposite side of the rear truck and passing over a pulley carried by the forward truck and secured to the plow frame.

3. A reversible disk plow as described having front and rear trucks, a plow frame pivotally connected to said trucks, a plurality of plow disks pivotally connected to said frame, reversing means for said plow disks, a cable secured to one side of the rear truck and passing around a pulley carried by the opposite side of the forward truck and secured to the plow frame, and a second cable secured to the opposite side of the rear truck and passing over a pulley carried by the opposite side of the forward truck and having its opposite end secured to the plow frame.

BENNETT O. LEACH.